United States Patent

Komabashiri

[11] Patent Number: 5,152,510
[45] Date of Patent: Oct. 6, 1992

[54] CYLINDRICAL ELASTIC MOUNT WITH VIBRATION DAMPER INCLUDING CYLINDRICAL RIGID SPLIT MEMBER

[75] Inventor: Osamu Komabashiri, Kasuagi, Japan
[73] Assignee: Tokai Rubber Industries, Ltd., Japan
[21] Appl. No.: 627,332
[22] Filed: Dec. 14, 1990

[30] Foreign Application Priority Data

Dec. 19, 1989 [JP] Japan .................. 1-329114

[51] Int. Cl.$^5$ .............. F16F 1/00; F16F 7/00; F16F 11/00; F16F 1/44
[52] U.S. Cl. .................. 267/141.2; 267/292; 267/153; 267/293; 267/140.11
[58] Field of Search ............ 267/292, 140.1, 140 A, 267/9, 140.1 R, 140.1 C, 141.2, 153, 293

[56] References Cited

U.S. PATENT DOCUMENTS 4,790,520 12/1988 Tanaka et al. ............ 267/292
4,840,359 6/1989 Hamaekers .............. 267/292

Primary Examiner—Joseph F. Peters, Jr.
Assistant Examiner—Kenneth Lee
Attorney, Agent, or Firm—Parkhurst, Wendel & Rossi

[57] ABSTRACT

A cylindrical elastic mount with a vibration damper, including radially spaced-apart inner and outer sleeves, an elastic body interposed between the inner and outer sleeves so as to elastically connct the two sleeves, and a generally cylindrical rigid split member disposed between the inner and outer sleeves and elasticallly supported by the two sleeves through the elastic body, such that the elastic body is divided by the rigid split member into radially inner and outer portions. The rigid split member and the elastic body cooperate with each other to provide the vibration damper. The generally cylindrical rigid split member consists of a plurality of rigid segments which are embedded in the elastic body such that adjacent segments of the plurality of rigid segments abut on each other at circumferentially opposed end faces thereof so as to assume a generally cylindrical shape. The radially outer portion of the elastic body is radially inwardly compressed between the outer sleeve and the rigid split member while the radially inner portion is radially inwardly compressed between the rigid split member and the inner sleeve.

11 Claims, 2 Drawing Sheets

CYLINDRICAL ELASTIC MOUNT WITH VIBRATION DAMPER INCLUDING CYLINDRICAL RIGID SPLIT MEMBER

BACKGROUND OF THE INVENTION

1. Field of the Invention

The present invention relates generally to a cylindrical elastic mount including a dynamic vibration damper, and more particularly to such a cylindrical elastic mount which can be produced with improved efficiency and is thus available at a reduced cost of manufacture.

2. Discussion of the Prior Art

A cylindrical elastic mount is known as a device for elastically or flexibly connecting two members in a vibration system in a vibration damping or isolating manner, or as a device for mounting one of the two members on the other member such that the one member is elastically or flexibly supported by the other member. Examples of such a cylindrical elastic mount are disclosed in laid-open publication No. 56-63141 of unexamined Japanese patent application, and laid-open publication No. 57-59119 of unexamined Japanese utility model application. The cylindrical elastic mount disclosed in these publications has an inner and an outer sleeve which are made of a metallic material and are disposed in radially spaced-apart, coaxial or non-coaxial relationship with each other. Between these inner and outer sleeves, there is interposed an elastic body such as a formed rubber mass, such that the two sleeves are elastically connected by the elastic body. The cylindrical elastic mount of this type is widely used as an engine mount adapted for use on a transverse front-engine front-drive (F-F) car, and as a body mount or a suspension bushing for a motor vehicle, for example.

As one type of the elastic mount as described above, there is known a cylindrical elastic mount having a dynamic vibration damper which consists of the elastic body, and a rigid member which is disposed between the inner and outer sleeves. This rigid member is embedded in or secured to the elastic body by means of vulcanization, and is supported by the inner and outer sleeves through the elastic body. In the presence of this dynamic vibration damper, the elastic mount exhibits a relatively low dynamic spring constant with respect to a middle- to high-frequency range of input vibrations. Although the rigid member included in the elastic mount may be a block-like member, it is preferable to employ a cylindrical rigid member which is disposed between the inner and outer sleeves so as to extend over the entire circumference of the mount. The use of the cylindrical member as the rigid member makes it easy to tune the dynamic spring characteristics of the elastic mount, and permits the elastic mount to provide an excellent damping effect with respect to the input vibrations applied in any radial direction.

When the cylindrical rigid member is provided between the inner and outer sleeves, the inner sleeve, the cylindrical rigid member and the outer sleeve are disposed in this order as viewed in a radially outward direction of the mount. Then, a radial spacing between the inner sleeve and the cylindrical rigid member and a radial spacing between the cylindrical rigid member and the outer sleeve are filled with respective masses of a suitable rubber material, so as to form radially inner and outer portions of the elastic body on the opposite sides of the cylindrical rigid member. In this case, when the outer sleeve is radially inwardly compressed after the elastic body is formed by vulcanization, it is practically impossible to give a suitable degree of preliminary radial compression to the radially inner portions of the elastic body interposed between the inner sleeve and the cylindrical rigid member.

In view of the above, the cylindrical rigid member is conventionally composed of radially inner and outer metallic members each having a cylindrical shape. More specifically, the conventional elastic mount consists of an inner bushing which has a first elastic body interposed between the inner sleeve and the inner metallic member for elastic connection therebetween, and an outer bushing which has a second elastic body interposed between the outer sleeve and the outer metallic member for elastic connection therebetween. After these inner and outer bushings are separately formed, the inner metallic member is radially inwardly compressed so that a suitable degree of preliminary radial compression is given to the first elastic body of the inner bushing. Similarly, the outer sleeve is radially inwardly compressed so that a suitable degree of preliminary radial compression is given to the second elastic body of the outer bushing. Thereafter, the outer metallic member of the outer bushing is fixedly fitted on the inner metallic member of the inner bushing, so as to provide an integrally formed bushing structure. In this manner, the intended cylindrical elastic mount with a vibration damper can be obtained.

In manufacturing the thus constructed cylindrical elastic mount, however, two tubular metallic members are needed for providing the cylindrical rigid member, and the inner and outer bushings must be prepared by respective vulcanizing operations for forming the first and second elastic bodies, and by respective drawing operations in which the inner metallic member and the outer sleeve are radially inwardly compressed. Further, the inner and outer bushings which are separately produced at different sites must be put together at an assembly site. Thus, the cylindrical elastic mount of the above type is manufactured with considerably low efficiency, at a relatively high cost, owing to a relatively large number of process steps required for forming the two independent bushings and assembling these bushings together. Further, this elastic mount requires two tubular metallic members, which also push up the cost of manufacture of the mount.

SUMMARY OF THE INVENTION

The present invention was developed in view of the drawback encountered in the prior art discussed above. It is therefore a first object of the present invention to provide a cylindrical elastic mount with a vibration damper including a generally cylindrical rigid member, which is simple in construction, and is economical to manufacture with significantly improved efficiency.

A second object of the present invention is to provide a method suitable for manufacturing such a cylindrical elastic mount as indicated above.

The above first object may be achieved according to the principle of the present invention, which provides a cylindrical elastic mount with a vibration damper comprising: (a) an inner and an outer sleeve which are disposed in spaced-apart relation with each other in a radial direction of the mount; (b) an elastic body interposed between the inner and outer sleeves so as to elastically connect the inner and outer sleeves; and (c) a generally cylindrical rigid split member disposed between the inner and outer sleeves and elastically supported by the inner and outer sleeves through the elastic body, such that the elastic body is divided by the rigid split member into radially inner and outer portions, the rigid split member and the elastic body cooperating with each other to provide the vibration damper. The generally cylindrical rigid split member consists of a plurality of rigid segments which are embedded in the elastic body such that adjacent segments of the plurality of rigid segments abut on each other at circumferentially opposed end faces thereof so as to assume a generally cylindrical shape. The radially outer portion of the elastic body is radially inwardly compressed between the outer sleeve and the rigid split member while the radially inner portion is radially inwardly compressed between the rigid split member and the inner sleeve.

The second object may be achieved according to a second aspect of the present invention, which provides a method of manufacturing a cylindrical elastic mount having an inner and an outer sleeve which are disposed in spaced-apart relation with each other in a radial direction of the mount, and an elastic body interposed between the inner and outer sleeves so as to elastically connect the inner and outer sleeves, comprising (a) the steps of embedding a plurality of substantially arcuate rigid segments in the elastic body such that the rigid segments are spaced apart from each other in a circumferential direction of the mount, with a predetermined clearance left between circumferentially opposed end faces of adjacent ones of the substantially arcuate rigid segments, and (b) radially inwardly compressing the outer sleeve so that the substantially arcuate rigid segments are brought into abutting contact with each other at the circumferentially opposed end faces, so as to provide a generally cylindrical rigid split assembly, which is embedded in the elastic body such that the elastic body is divided by the rigid split assembly into a radially outer portion which is radially inwardly compressed between the outer sleeve and the rigid split assembly, and a radially inner portion which is radially inwardly compressed between the rigid split assembly and the inner sleeve.

When the present cylindrical elastic mount is constructed as described above according to the present invention, the rigid segments for the generally cylindrical rigid split member or assembly are moved toward each other in radial directions as the diameter of the outer sleeve is reduced by a radially inward drawing operation, so that the preliminary compression is effectively given to the radially inner portion of the elastic body as well as to the radially outer portion. After the rigid segments abut on each other to form the generally cylindrical rigid split assembly, an increase in the compressive force applied to the outer sleeve acts on the radially outer portion of the elastic body, so that a suitable degree of preliminary compression is given to the radially outer portion of the elastic body between the outer sleeve and the rigid split member.

In the above arrangement, the present elastic mount need not have the conventional two-part structure which includes two independently prepared bushings, but may be prepared as a single integral unit formed by vulcanization of a rubber material such that the inner and outer sleeves and the rigid segments of the rigid split member are integrally connected to each other by the elastic body of the rubber material. Accordingly, the present elastic mount may be manufactured by only one vulcanizing operation for forming the integral unit, and only one drawing operation in which the preliminary compression is effectively given to both of the radially inner and outer portions of the elastic body. Further, the generally cylindrical rigid split member may be formed from a plurality of metallic sheet members, which can be pressed into the rigid segments, rather than an expensive tubular member or members. Thus, the present cylindrical elastic mount with a vibration damper is considerably simple in construction, and can be manufactured with significantly high efficiency, at a relatively low cost.

The generally cylindrical rigid split member may have at least one hole formed through the thickness thereof, so that the radially inner and outer portions of the elastic body are integrally connected to each other through the at least one hole.

The elastic body may have at least one inner void formed in the radially inner portion, and at least one outer void formed in the radially outer portion, such that the inner and outer voids are located adjacent to corresponding circumferential ends of the adjacent segments, and such that the inner and outer voids extend in an axial direction of the elastic mount.

Further, the elastic body may have an axial void which is formed in the radially inner portion so as to extend in an axial direction of the elastic mount over a substantially entire axial length of the elastic body. This axial void has a generally arcuate shape in cross section.

The generally cylindrical rigid split member may consist of a pair of semicylindrical members as the plurality of rigid segments which abut on each other at circumferentially opposed end faces thereof, such that each of the pair of semicylindrical members extends in a circumferential direction of the mount along a corresponding half of an inner circumferential surface of the outer sleeve. Each of the semicylindrical members may have an axial length which is larger than that of the elastic body, and extends through the elastic body in an axial direction of the elastic mount. The pair of semicylindrical members may be disposed such that a plane including the mutually abutting circumferentially opposed end faces is substantially perpendicular to a direction in which a vibrational load is primarily applied to the elastic mount.

The present cylindrical elastic mount may be constructed such that a radial distance between the inner sleeve and the generally cylindrical rigid split member is larger than a radial distance between the outer sleeve and the generally cylindrical rigid split member.

The present cylindrical elastic mount may be constructed such that the inner and outer sleeves are eccentrically offset from each other in a diametric direction in which a vibrational load is primarily applied to the elastic mount.

The radially outer portion of the elastic body may be radially inwardly compressed by radially inwardly drawing the outer sleeve of an intermediate product of the elastic mount wherein the circumferentially opposed end faces of the adjacent segments of the generally cylindrical rigid split member are spaced apart from each other by a predetermined distance in a circumferential direction of the mount. In this case, the circumferentially opposed end faces are brought into abutting contact with each other when the outer sleeve is radially inwardly drawn, whereby the radially inner portion of the elastic body is radially inwardly compressed.

BRIEF DESCRIPTION OF THE DRAWINGS

The above and optional objects, features and advantages of the present invention will be better understood by reading the following detailed description of a presently preferred embodiment of the invention, when considered in connection with the accompanying drawings, in which.

DETAILED DESCRIPTION OF THE PREFERRED EMBODIMENTS

Figure 1:
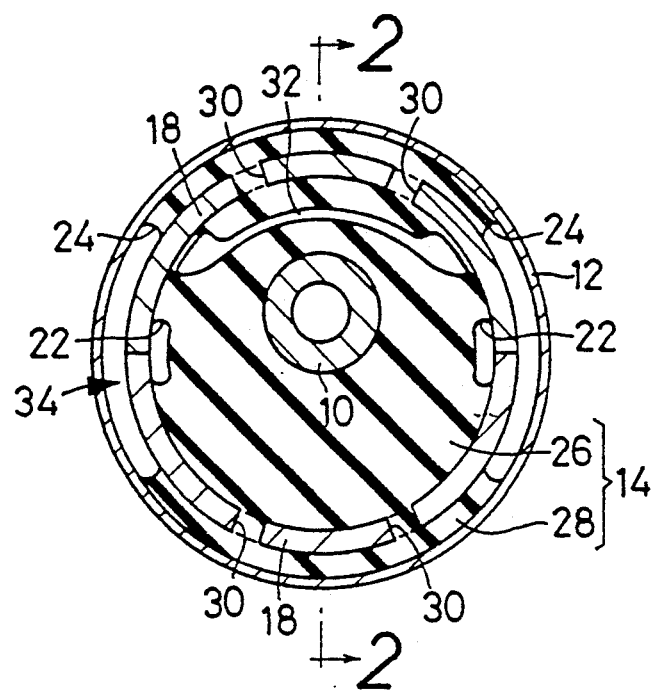
FIG. 1 is an elevational view in transverse cross section of one embodiment of a cylindrical elastic mount of the invention in the form of an engine mount for a motor vehicle.
Figure 2:
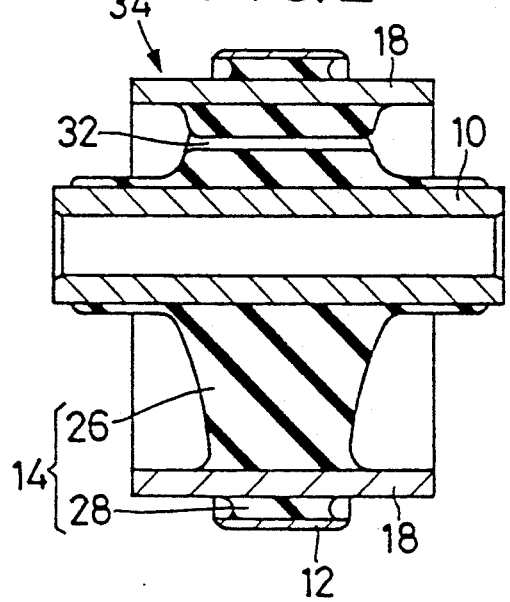
FIG. 2 is an elevational view in axial cross section taken along line 2—2 of FIG. 1.

Referring first to FIGS. 1 and 2, there is shown a cylindrical elastic engine mount with a vibration damper adapted for use on a front-engine front-drive (F-F) car. In these figures, reference numerals 10 and 12 denote an inner and an outer sleeve which are made of metal and are radially spaced apart from each other. The inner and outer sleeves 10, 12 are disposed such that the two sleeves 10, 12 are eccentric with respect to each other by a predetermined offset distance in a diametric direction in which vibrations are primarily received by the engine mount. Between the inner and outer sleeves 10, 12, there is interposed an elastic body 14 such that the two sleeves 10, 12 are elastically connected to each other by the elastic body 14.

In use, the engine mount is installed on the car such that one of the inner and outer sleeves 10, 12 is connected to the body of the car while the other sleeve 10, 12 is fixed to an engine unit of the car, so that the engine unit is elastically or flexibly mounted on the car body via the engine mount. With the engine mount installed in position on the car, the weight of the engine unit acts on the inner or outer sleeve 10, 12, whereby the two sleeves 10, 12 are displaced relative to each other, with elastic deformation of the elastic body 14, in the diametric direction (vertical direction as viewed in FIG. 1) in which the two sleeves 10, 12 are originally eccentric with respect to each other. With the relative displacement of the inner and outer sleeves 10, 12 due to the weight of the engine unit, the two sleeves 10, 12 are held in substantially coaxial or concentric relation with each other. A dynamic vibrational load is applied to the present engine mount thus installed on the car, primarily in the above-indicated diametric direction in which the inner and outer sleeves 10, 12 are eccentrically offset from each other. This direction is hereinafter referred to as "load-receiving direction" of the engine mount.

Figure 3:
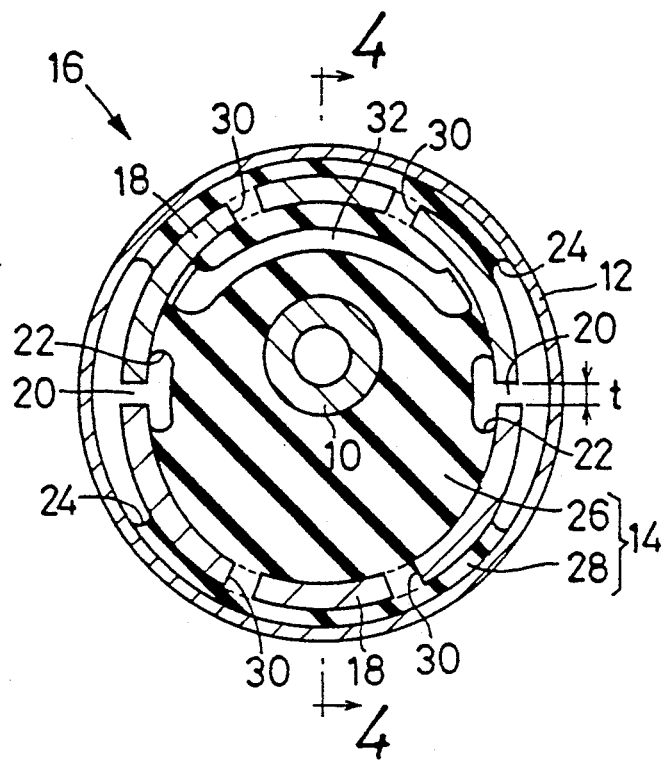
FIG. 3 is a transverse cross sectional view of an integral unit of the engine mount of FIG. 1, which is produced as an intermediate product by vulcanizing a rubber material to form an elastic body secured to the other members of the mount.
Figure 4:
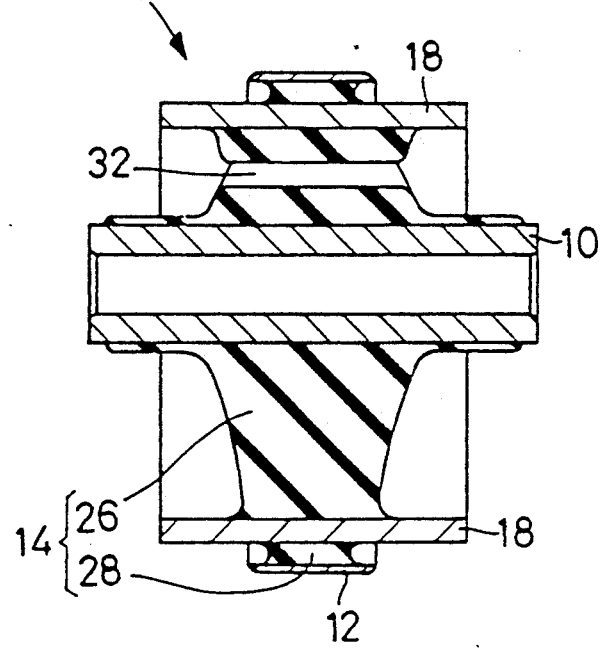
FIG. 4 is an axial cross sectional view taken along line 4—4 of FIG. 3.

The inner sleeve 10 is a cylindrical member having a comparatively large wall thickness. The outer sleeve 12 is a relatively thin-walled cylindrical member having a larger diameter than that of the inner sleeve 10. This outer sleeve 12 is disposed radially outwardly of the inner sleeve 10 such that the outer sleeve 12 is eccentric with respect to the inner sleeve 10, by a suitable radial distance. The elastic body 14 is a generally annular member having a comparatively large wall thickness. The inner and outer sleeves 10, 12 and the elastic body 14 cooperate to constitute an integral unit 16, as shown in FIGS. 3 and 4. This integral unit 16 is prepared as an intermediate product during manufacture of the engine mount, by vulcanizing an unvulcanized rubber material filling a spacing between the inner and outer sleeves 10, 12, to form the elastic body 14 whose inner and outer circumferential surfaces are secured to the inner and outer sleeves 10, 12, respectively.

Between the inner and outer sleeves 10, 12 of the integral unit 16, there are disposed a plurality of rigid segments in the form of two semicylindrical metallic members 18, 18 each having a suitable thickness, such that the semicylindrical members 18, 18 are embedded in diametrically opposite portions of the elastic body 14, which are located on the opposite sides of the inner sleeve 10 as viewed in the load-receiving diametric direction in which the inner and outer sleeves 10, 12 are offset from each other. These semicylindrical members 18, 18 are opposed to each other in the above-indicated load-receiving diametric direction, such that the opposite circumferential end faces of one of the semicylindrical members 18 are spaced apart from the corresponding circumferential end faces of the other semicylindrical members 18 by a predetermined distance. As shown in FIG. 3, each semicylindrical member 18 extends along the corresponding one of the upper and lower halves of the inner circumferential surface of the outer sleeve 12. The semicylindrical members 18 have an axial length larger than that of the elastic body 14, so as to extend through the elastic body 14, as shown in FIG. 4. With the inner and outer circumferential surfaces of each semicylindrical member 18 being secured by vulcanization to radially inner and outer portions 26, 28 of the elastic body 14, the semicylindrical members 18, 18 are elastically connected to the inner and outer sleeves 10, 12 via the elastic body 14.

As shown in FIG. 3, the elastic body 14 does not intervene between the circumferentially opposite end faces of one of the semicylindrical members 18 and the corresponding end faces of the other cylindrical member 18. Thus, the two semicylindrical members 18 are opposed to each other with suitable clearances 20, 20 left between the corresponding circumferential end faces which face each other in the circumferential direction of the mount. More specifically, the elastic body 14 has a pair of inner voids 22 formed in the radially inner portion 26, and a pair of outer voids 24 formed in the radially outer portion 28, such that the corresponding circumferential end portions of the semicylindrical members 18 are radially interposed between and exposed to the inner and outer voids 22, 24. The inner and outer voids 22, 24 are formed over respective given lengths in the circumferential direction of the elastic body 14, while extending over the entire axial length of the elastic body 14. These inner and outer voids 22, 24 serve to facilitate relative displacement of the semicylindrical members 18, 18 toward each other when the outer sleeve 12 is radially inwardly compressed in a subsequent drawing process which will be described later.

As is understood from the above description, the elastic body 14 is substantially divided by the semicylindrical members 18, 18 into the radially inner and outer portions 26, 28. Each of the semicylindrical members 18 has two holes 30, 30 formed through the thickness thereof, such that the holes 30 are spaced apart from each other in the circumferential direction of the member 18. The radially inner and outer portions 26, 28 indicated above are connected to each other through these holes 30, 30 so as to provide the integrally formed elastic body 14.

The elastic body 14 has an axial void 32 formed through one of the above-indicated diametrically opposite portions thereof at which the radial distance between the inner and outer sleeves 10, 12 is the shortest. The axial void 32 is formed through the entire axial length of the elastic body 14, and has a generally arcuate cross sectional shape as shown in FIG. 3, with a suitable circumferential length (about one-third of the circumference of the elastic body 14) along the inner circumferential surface of the upper semicylindrical member 18. The thus formed axial void 32 serves to reduce an amount of tensile strain in the elastic body 14 when the engine mount is installed in position such that the elastic body 14 is elastically deformed by the weight of the engine unit which acts on the engine mount so as to cause relative radial displacement of the inner and outer sleeves 10, 12, as described above.

The thus constructed integral unit 16 of FIGS. 3 and 4 consisting of the inner and outer sleeves 10, 12, the semicylindrical members 18 and the elastic body 14 is radially inwardly compressed at the outer sleeve 12, by a suitable drawing operation using a circular array of eight dies, for example, whereby the present engine mount as shown in FIGS. 1 and 2 is obtained.

When the integral unit 16 is radially inwardly compressed as described above, the compressive force applied to the outer sleeve 12 acts on the semicylindrical members 18, 18 through the radially outer portion 28 of the elastic body 14, so that the semicylindrical members 18, 18 are moved toward each other in the load-receiving direction in which the two members 18, 18 are opposed to each other. In the instant embodiment, in particular, the inner and outer voids 22, 24 formed in the vicinity of the opposite circumferential ends of the semicylindrical members 18 permit the compressive force applied to the outer sleeve 12 to effectively act on the semicylindrical members 18, 18, for facilitating the relative displacement of the semicylindrical members 18, 18 toward each other.

As the semicylindrical members 18, 18 are moved toward each other in the load-receiving direction, the diameter of the combination of the two semicylindrical members 18, 18 is substantially reduced, whereby an effective degree of the preliminary compression is given to the radially inner portion 26 of the elastic body 14 which is located radially inside of the semicylindrical members 18.

As the compressive force is applied to the outer sleeve 12, the corresponding circumferential end faces of the semicylindrical members 18 are brought into abutting contact with each other such that the plane including the mutually abutting circumferential end faces is perpendicular to the load-receiving direction. With a further compressive force applied to the integral unit 16, the corresponding circumferential end faces of the semicylindrical members 18 are pressed against each other, so that the semicylindrical members 18, 18 cooperate to constitute an integral cylindrical rigid split member in the form of a cylindrical metallic assembly 34 as shown in FIGS. 1 and 2.

Once the semicylindrical members 18, 18 are formed into the cylindrical metallic assembly 34 in the manner as described above, the compressive force applied to the outer sleeve 12 no longer acts on the radially inner portion 26 of the elastic body 14. Consequently, a further increase in the compressive force applied to the outer sleeve 12 acts exclusively on the radially outer portion 28 of the elastic body 14, so that a suitable degree of preliminary compression is given to the radially outer portion 28.

By applying a suitable amount of compressive force to the outer sleeve 12 of the integral unit 16 as described above, there is obtained an engine mount with a vibration damper according to the present invention, in which the cylindrical metallic assembly 34 disposed between the inner and outer sleeves 10, 12 is supported by the two sleeves 10, 12 through the elastic body 14.

In the thus constructed engine mount, the elastic body 14 consisting of the radially inner and outer portions 26, 28 can be formed in only one vulcanization process. That is, the present engine mount is constituted by a single intermediate product in the form of the integral unit 16 which is prepared by only one vulcanizing operation for forming the elastic body 14 secured to the inner and outer sleeves 10, 12 and the semicylindrical members 18. Thus, the present engine mount with a vibration damper has a considerably simple construction.

Further, suitable degrees of preliminary radial compression can be given to both the radially inner and outer portions 26, 28 of the elastic body 14 during the single drawing operation in which the compressive force is applied to the outer sleeve 12. Thus, the process of manufacturing the present engine mount is significantly simplified. Moreover, the cylindrical metallic assembly 34 is constituted by two or more rigid members formed by pressing of sheet members, rather than a pipe or other tubular member. Thus, the present engine mount can be manufactured with significantly improved efficiency, and the cost of manufacture of the mount is accordingly reduced.

In the instant engine mount, the degree of the preliminary compression given to the radially inner portion 26 of the elastic body 14 can be suitably determined by adjusting the distance of movement of the semicylindrical members 18, 18 toward each other, that is, the dimension of the clearances 20 between the corresponding circumferential end faces of the semicylindrical members 18, 18 of the intermediate product 16. The degree of the preliminary compression given to the radially outer portion 28 can also be suitably determined by adjusting the amount of the compressive force applied to the outer sleeve 12 after the two semicylindrical members 18 abut on each other. Thus, the degrees of the preliminary compression given to the radially inner and outer portions 26, 28 of the elastic body 14 can be easily determined as desired, assuring a great degree of freedom in designing the engine mount.

For instance, the integral unit 16 (intermediate product) as shown in FIG. 3 is dimensioned such that the circumferential length of each clearance 20 formed between the corresponding circumferential ends of the semicylindrical members 18, 18 is equal to 4.2 mm, and such that the outside diameter of the outer sleeve 12 before the drawing operation is equal to 100 mm. In the engine mount of FIG. 1 obtained from the thus dimensioned integral unit 16, the outside diameter of the outer sleeve 12 is reduced by the drawing operation to 95 mm. In this case, the degree of the preliminary compression given to the radially inner portion 26 of the elastic body 14 is determined by the distance (i.e., 4.2 mm) of relative movement of the semicylindrical members 18, 18 toward each other. On the other hand, the degree of the preliminary compression given to the radially outer portion 28 of the elastic body 14 is determined by the amount of the compressive force which is applied to the outer sleeve 12 after the semicylindrical members 18, 18 abut on each other and are formed integrally into the metallic assembly 34, based on the amount of reduction in the outside diameter of the outer sleeve 12 (100−95−4.2=0.8 mm). In this specific example, the preliminary compression is effectively applied to both the radially inner and outer portions 26, 28 of the elastic body 14.

While the present invention has been described in its presently preferred embodiment, for illustrative purposed only, it is to be understood that the invention is not limited to the details of the illustrated embodiment, but various changes, modifications and improvements may be made in the invention.

For instance, the dimensions, configuration, weight and position of the cylindrical metallic assembly 34 as the cylindrical rigid split member may be suitably determined or changed as needed, depending on the required vibration damping and/or isolating characteristics of the mount.

The axial void 32 formed through the elastic body 14 may be modified or eliminated, depending upon the required vibration damping and/or isolating characteristics of the mount.

Further, the inner and outer voids 22, 24 formed in the vicinity of the opposite circumferential ends of the semicylindrical members 18, 18 are not essential to the practicing of the principle of the present invention.

While the cylindrical metallic assembly 34 as the rigid split member is constituted by two rigid segments in the form of the two semicylindrical members 18, 18 in the illustrated embodiment, the rigid split member may be constituted by three or more arcuate segments or segments having other shapes, which are spaced from each other in the circumferential direction of the mount before the segments are brought into abutting contact with each other to form the generally cylindrical rigid split member. For instance, the rigid split member may have a polygonal shape such as a hexagon or octagon.

Although the illustrated embodiment is adapted to be used as an engine mount for a motor vehicle, the concept of the invention may be embodied as vehicle body mounts, vehicle suspension bushings, and other elastic mounts whose applications are not limited to the motor vehicle.

It is also to be understood that the present invention may be embodied with various other changes, modifications and improvements, which may occur to those skilled in the art, without departing from the spirit and scope of the invention defined in the following claims.

What is claimed is:

1. A cylindrical elastic mount with a vibration damper comprising:
   an inner and an outer sleeve which are disposed in spaced-apart relation with each other in a radial direction of the mount;
   an elastic body interposed between said inner and outer sleeves so as to elastically connect the inner and outer sleeves;
   a generally cylindrical rigid split member disposed between said inner and outer sleeves and elastically supported by said inner and outer sleeves through said elastic body, such that said elastic body is divided by said rigid split member into radially inner and outer portions, said rigid split member and said elastic body cooperating with each other to provide said vibration damper; and
   said generally cylindrical rigid split member consisting of a plurality of rigid segments which are embedded in said elastic body such that adjacent segments of said plurality of rigid segments abut on each other at circumferentially opposed end faces thereof so as to assume a generally cylindrical shape, said radially outer portion of said elastic body being radially inwardly compressed between said outer sleeve and said rigid split member while said radially inner portion being radially inwardly compressed between said rigid split member and said inner sleeve.

2. A cylindrical elastic mount according to claim 1, wherein said generally cylindrical rigid split member has at least one hole formed through the thickness thereof, so that said radially inner and outer portions of said elastic body are integrally connected to each other through said at least one hole.

3. A cylindrical elastic mount according to claim 1, wherein said elastic body has at least one inner void formed in said radially inner portion, and at least one outer void formed in said radially outer portion, such that said inner and outer voids are located adjacent to corresponding circumferential ends of said adjacent segments, and such that said inner and outer voids extend in an axial direction of the elastic mount.

4. A cylindrical elastic mount according to claim 1, wherein said elastic body has an axial void which is formed in said radially inner portion so as to extend in an axial direction of the elastic mount over a substantially entire axial length of said elastic body, said axial void having a generally arcuate shape in cross section.

5. A cylindrical elastic mount according to claim 1, wherein said generally cylindrical rigid split member consists of a pair of semicylindrical members as said plurality of rigid segments which abut on each other at circumferentially opposed end faces thereof, such that each of said pair of semicylindrical members extends in a circumferential direction of the mount along a corresponding half of an inner circumferential surface of said outer sleeve.

6. A cylindrical elastic mount according to claim 5, wherein each of said semicylindrical members has an axial length which is larger than that of said elastic body, and extends through said elastic body in an axial direction of the elastic mount.

7. A cylindrical elastic mount according to claim 5, wherein said pair of semicylindrical members are disposed such that a plane including the mutually abutting circumferentially opposed end faces is substantially perpendicular to a direction in which a vibrational load is primarily applied to the elastic mount.

8. A cylindrical elastic mount according to claim 1, wherein a radial distance between said inner sleeve and said generally cylindrical rigid split member is larger than a radial distance between said outer sleeve and said generally cylindrical rigid split member.

9. A cylindrical elastic mount according to claim 1, wherein said inner and outer sleeves are eccentrically offset from each other in a diametric direction in which a vibrational load is primarily applied to the elastic mount.

10. A cylindrical elastic mount according to claim 1, wherein said radially outer portion of said elastic body is radially inwardly compressed by radially inwardly drawing said outer sleeve of an intermediate product of the elastic mount wherein said circumferentially opposed end faces of said adjacent segments of said generally cylindrical rigid split member are spaced apart from each other by a predetermined distance in a circumferential direction of the mount, said circumferentially opposed end faces being brought into abutting contact with each other when said outer sleeve is radially inwardly drawn, whereby said radially inner portion of said elastic body is radially inwardly compressed.

11. A method of manufacturing a cylindrical elastic mount having an inner and an outer sleeve which are disposed in spaced-apart relation with each other in a radial direction of the mount, and an elastic body interposed between the inner and outer sleeves so as to elastically connect the inner and outer sleeves, comprising the steps of:

embedding a plurality of substantially arcuate rigid segments in said elastic body such that said rigid segments are spaced apart from each other in a circumferential direction of the mount, with a predetermined clearance left between circumferentially opposed end faces of adjacent ones of said substantially arcuate rigid segments; and radially inwardly compressing said outer sleeve so that said substantially arcuate rigid segments are brought into abutting contact with each other at said circumferentially opposed end faces, so as to provide a generally cylindrical rigid split assembly, which is embedded in said elastic body such that said elastic body is divided by said rigid split assembly into a radially outer portion which is radially inwardly compressed between said outer sleeve and said rigid split assembly, and a radially inner portion which is radially inwardly compressed between said rigid split assembly and said inner sleeve.

* * * * *